Nov. 11, 1958
R. B. SHIPLEY
2,860,303
IMPEDANCE RELAY TESTER
Filed Sept. 19, 1955
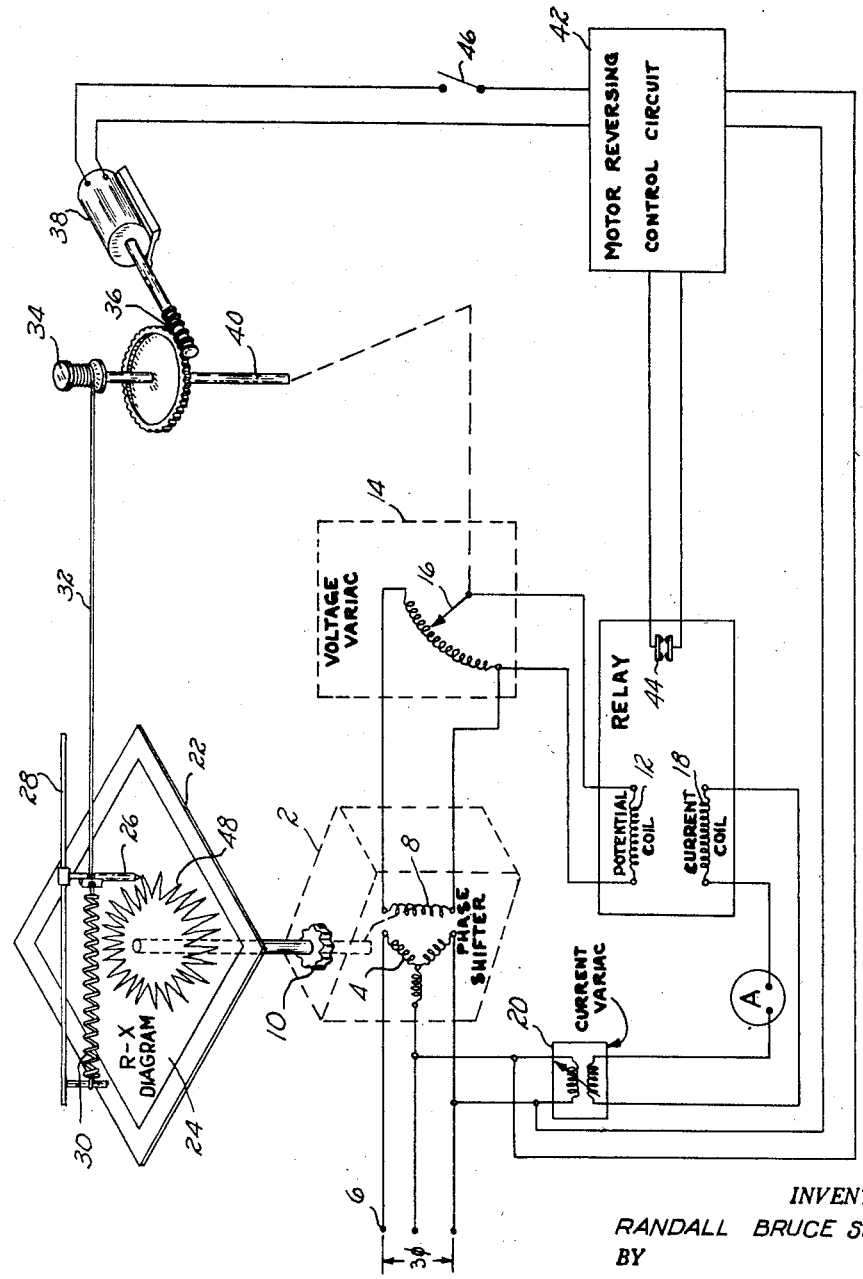
INVENTOR.
RANDALL BRUCE SHIPLEY
BY
*Lindsey and Prutzman*
ATTORNEYS 2,860,303

Patented Nov. 11, 1958

2,860,303

IMPEDANCE RELAY TESTER

Randall Bruce Shipley, Chattanooga, Tenn., assignor to Tennessee Valley Authority, a corporation of the United States Application September 19, 1955, Serial No. 535,047

5 Claims. (Cl. 324—28)

This invention relates to apparatus for testing distance or impedance relays.

Impedance relays are widely used for fault protection in long-distance electrical transmission lines. To insure proper operation of such relays, it is essential that they be carefully and accurately adjusted before being placed in service, and it is customary to check their operation characteristics from time to time thereafter. Heretofore, the testing of such relays has required the taking of simultaneous readings of relay current and voltage as a function of phase angle between the two, as well as the laborious tabulation of such data and manual plotting of impedance diagrams necessary to obtain the desired information as to relay operating characteristics. Such a testing procedure is thus not only tedious, but also time-consuming and costly.

One object of the present invention, therefore, is to provide apparatus for determining the complete operating characteristics of an impedance relay without the taking of readings or preparation of tabulated data heretofore required, and in considerably less time than heretofore required.

Another object is to provide semi-automatic impedance relay test apparatus which produces a graphical record of the operating characteristics of the relay.

Another object is to provide distance relay test apparatus which records on a single graph not only the pick-up characteristics of a relay under test, but also the drop-out and ohmic reach characteristics.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawing the single figure is a schematic diagram of a relay testing apparatus constructed in accordance with the present invention.

Referring to the drawing, the relay test apparatus includes an adjustable phase shifter 2 having a three-phase stator coil 4 supplied with a suitable reference voltage at terminals 6 and having a rotor coil 8 mechanically rotatable by any suitable means such as manual knob 10 for developing an output voltage variable in phase relative to the reference voltage. The output of the phase shifter is connected to the potential coil 12 of the distance relay to be tested through a voltage variac 14, having a movable voltage adjusting member 16 which permits variation of the magnitude of the voltage applied to the potential coil. A constant current having a fixed phase relation with the reference voltage is supplied to the current coil 18 of the relay from any convenient source, such as one phase of the three-phase reference voltage. To permit adjustment of the current magnitude, the current variac 20 is provided in circuit with current coil 18.

Mechanically connected to the rotor of the phase shifter for simultaneous rotation therewith is a plotting board 22 adapted to receive a polar coordinate plotting sheet 24 on which the operating characteristics of the relay are recorded during operation of the apparatus. Above the plotting board is a scriber or stylus 26 mounted on a support 28 for reciprocating movement in a radial direction relative to the center of the plotting board, and arranged to produce a trace on the plotting sheet. The stylus is biased in the left hand direction, as shown in the drawing, by a spring 30, and is arranged to be drawn in a right hand direction by a wire 32 wound on a spool 34 connected through a worm-wheel and worm 36 to a drive motor 38.

The motor 38 is also drivingly connected through shaft 40 to the movable voltage varying contact 16 of the voltage variac. With this arrangement it may be seen that operation of the motor causes a simultaneous variation in the output voltage of the variac 14 and the radial position of the scriber 26 relative to the plotting board. The motor is arranged to be driven first in one direction and then in the opposite direction by a conventional motor reversing control circuit 42 under the control of the tripping contacts 44 of the relay under test. The direction of motor operation is arranged so that when the relay tripping contacts are open the motor will drive the variac in a voltage decreasing direction and move the stylus in a radially inward direction relative to the plotting board. The motor reversing control circuit 42 is energized from any suitable source, such as one phase of the reference voltage. The motor circuit also includes a manual shut-off switch 46, and suitable motor limit switches, not shown, for preventing overtravel of the stylus 26 and variac contact 16 in either direction.

In the operation of the device the plotting sheet 24 is fitted on the plotting board 22 and adjusted so that the stylus 26 is located at an angular position corresponding to zero degrees phase angle on the plotting sheet when the phase shifter rotor 8 is set for zero phase shift. The stylus is also adjusted so that it is positioned radially at the center of the plotting sheet 24 when the output voltage of the variac is zero. Thereafter when the motor is operated in the proper direction to drive the movable member of the voltage variac in a voltage increasing direction, the stylus will simultaneously be displaced outwardly from the center of the graph. When the variac voltage supplied the relay potential coil 12 has increased sufficiently to stimulate a transmission line impedance large enough to cause opening or drop-out of contacts 44 of the relay, the motor will be automatically reversed. The voltage variac will then automatically be driven in such a direction as to reduce the voltage to the relay potential coil, and the stylus will be driven back toward the center of the graph. When the voltage supplied to potential coil 12 has thereby been decreased sufficiently to stimulate a transmission line impedance such that the relay contacts close, the motor is again reversed, driving the voltage variac in an increasing voltage direction and driving the stylus in a radially outward direction. Thus, the variac is continuously driven back and forth between points corresponding to the pick-up and drop-out points of the relay under test; and the stylus automatically makes a permanent record of these pick-up and drop-out points on the plotting sheet. With a constant current supplied to the relay the voltage at the pick-up and drop-out points will be proportional to the ohmic reach of the relay. Therefore, by merely rotating the phase shifter rotor 8 through the desired range of phase angles between relay current and voltage, the plotting board will be simultaneously rotated in accordance with phase angle, and the complete characteristic curve of the relay is automatically plotted as a polar coordinate R–X diagram 48 on the plotting sheet, the radially innermost points of the graph corresponding to relay pick-up points and the outermost points corresponding to relay drop-out points. The scale of the plot is of course a function of the magnitude of the current applied to the relay current coil.

Thus, it may be seen that the relay tester completely eliminates the laborious steps of meter reading and data tabulation heretofore required, and produces in a minimum of time an R–X diagram of the complete relay operating characteristics which is uniformly accurate. The test apparatus also has the advantage that the graph thus obtained may also be utilized to ascertain readily various other relay conditions which may require attention or adjustment. For instance, a routine plot of the relay characteristic with the instant test apparatus may show that the ohmic pick-up is lower than that originally set, a condition which may indicate for example an accumulation of film or other foreign matter on the contacts such as to increase contact resistance. Likewise an increase in the difference between the pick-up and drop-out settings would indicate friction in the pivots of the relay, or some other drag in the moving element. Thus the present apparatus provides a means of quickly making a routine test on a distance relay sufficient to determine its operating condition without the necessity of making the many painstaking and tedious measurements heretofore required. Moreover, since the settings of distance relays are usually determined by the use of polar coordinate R–X diagrams, the R–X diagram obtained with the instant test apparatus may be easily compared directly with previously constructed graphs of the selected settings, and any discrepancies may be readily observed and corrected.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. An apparatus for producing a polar co-ordinate R–X diagram indicative of the pick-up, drop-out, and the ohmic reach characteristics of a distance relay of the type including a current coil, potential coil and tripping contacts operably responsive to the magnitude and phase of the current and potential, respectively, in a multiple phase power line to which the relay is adapted to be connected; the combination comprising a phase shifter including a stator coil adapted for connection to a regulated source of alternating voltage and rotor coil for developing a voltage in phase shift relation to said source, a two-co-ordinate plotting board mounted for synchronous rotation with said rotor and means for such rotation, a variable output type current transformer including input and output terminals adapted for connection to said source and to the current coil of a distance relay, respectively, a variable voltage device having its input connected to the rotor of said phase shifter and output terminals adapted for connection to the potential coil of a relay, a stylus associated with said plotting board for movement transversely thereof, a reversible motor, drive means between said motor and stylus for reversible movement of said stylus on said board responsive to the reversible drive of said motor, drive means between said motor and source of variable voltage to vary the output thereof in response to the reversible drive of said motor, a motor reversing circuit including control terminals adapted for connection to the relay tripping contacts, and an output circuit connected to said motor, whereby said stylus is reciprocably driven across said board by said motor in response to the relative magnitude and phase of currents and voltages applied to the current coil and voltage coil of an impedance relay connected to said apparatus for test.

2. Apparatus for testing impedance relays of the type having a current coil, a potential coil, and tripping contacts connected to said apparatus during test but not a part thereof, said tripping contacts operable in accordance with the relative magnitude and phase of currents and voltages applied to the current coil and potential coil comprising a reference voltage source an adjustable phase shifter adapted to be supplied from said reference voltage source and having an output voltage variable in phase relative to the reference voltage in accordance with adjustment thereof, current regulating means connected to said reference voltage source for supplying the current coil of the relay with a constant current having a fixed phase relation with the reference voltage, voltage varying means connected between the output of the phase shifter and the potential coil of the relay and having a movable voltage adjusting member adapted to vary the voltage supplied to said potential coil, a polar-coordinate plotting board mounted for angular displacement in accordance with adjustment of the phase shifter, scribing means mounted for radial movement relative to the plotting board, and a reversible motor controlled by the tripping contacts of the relay for driving the voltage adjusting member and scribing means in synchronism.

3. Apparatus for testing impedance relays of the type having a current coil, a potential coil, and tripping contacts connected to said apparatus during test but not a part thereof, said tripping contacts operable in accordance with the relative magnitude and phase of currents and voltages applied to the current coil and potential coil comprising a reference voltage source a phase shifter having a stator coil adapted to be connected to said reference voltage source and a rotor coil for developing a voltage variable in phase relative to the reference voltage, a current regulator adapted to be connected between the reference voltage source and the current coil of the relay to supply to said current coil a constant current having a fixed phase relation with the reference voltage, voltage varying means connected between the rotor coil of the phase shifter and the potential coil of the relay and having a movable voltage adjusting member for varying the voltage supplied to said potential coil, a polar coordinate plotting board, means for rotating the plotting board in synchronism with the rotor coil of the phase shifter, scribing means mounted for radial movement relative to the plotting board, and a reversible motor controlled by the tripping contacts of the relay for driving the voltage adjusting member and scribing means in synchronism.

4. Apparatus for testing impedance relays of the type having a current coil, a potential coil, and tripping contacts connected to said apparatus during test but not a part thereof, said tripping contacts operable in accordance with the relative magnitude and phase of currents and voltages applied to the current coil and potential coil comprising a three-phase reference voltage source a phase shifter having a stationary input coil adapted to be connected to said three phase reference voltage source and a rotatable output coil for developing a voltage variable in phase relative to the reference voltage, a current variac adapted to be connected between one phase of the reference voltage source and the current coil of the relay to supply to said current coil a constant current having a fixed phase relation with the reference voltage, a voltage variac connected between the phase shifter and the potential coil of the relay and having a movable voltage varying member for varying the voltage supplied to said potential coil, a polar-coordinate plotting board rotatable with the output coil of the phase shifter, scribing means mounted for radial movement relative to the plotting board, and a reversible motor controlled in direction by the tripping contacts of the relay for driving said voltage varying member and said scribing means in synchronism, said motor being arranged to drive said voltage varying member in a voltage increasing direction while driving said scribing means in a radially outward direction.

5. Apparatus for testing impedance relays of the type having a current coil, a potential, and tripping contacts connected to said apparatus during test but not a part thereof, said tripping contacts operable in accordance with the relative magnitude and phase of currents and voltages applied to the current coil and potential coil comprising a reference voltage source, a mechanically adjustable phase shifter adapted to be supplied from said reference voltage source and having an output voltage variable in phase relative to the reference voltage in accordance with mechanical adjustment thereof, current regulating means connected between the reference voltage source and the current coil of the relay to supply to said current coil a constant current having a fixed phase relation with the reference voltage, a voltage variac connected between the output of the phase shifter and the potential coil of the relay and having a movable voltage adjusting member adapted to vary the voltage supplied to said potential coil, a reversible motor controlled by the tripping contacts of the relay, means forming a first driving connection between said movable voltage adjusting member and the motor, a polar-coordinate plotting board mounted for rotation in accordance with mechanical adjustment of the phase shifter, scribing means mounted for radial movement relative to the plotting board, and means forming a second driving connection between the motor and scribing means for moving the scribing means in a radially outward direction concurrently with movement of said voltage adjusting member in a voltage increasing direction.

References Cited in the file of this patent

UNITED STATES PATENTS

| | | |
|---|---|---|
| 2,478,945 | Rose | Aug. 16, 1949 |
| 2,478,946 | Rose | Aug. 16, 1949 |